(12) United States Patent
McCarthy

(10) Patent No.: US 11,652,651 B1
(45) Date of Patent: May 16, 2023

(54) ENERGY EFFICIENT ETHERNET (EEE) LINK RECOVERY FROM LOW SNR

(71) Applicant: Marvell Asia Pte, Ltd., Singapore (SG)

(72) Inventor: Frank Jeremiah McCarthy, Alameda, CA (US)

(73) Assignee: Marvell Asia Pte Ltd, Singapore (SG)

( * ) Notice: Subject to any disclaimer, the term of this patent is extended or adjusted under 35 U.S.C. 154(b) by 104 days.

(21) Appl. No.: 17/387,847

(22) Filed: Jul. 28, 2021

Related U.S. Application Data

(60) Provisional application No. 63/057,763, filed on Jul. 28, 2020.

(51) Int. Cl.
| | | |
|---|---|---|
| *H04L 12/10* | (2006.01) | |
| *H04L 12/40* | (2006.01) | |
| *H04L 12/931* | (2013.01) | |
| *H04B 17/336* | (2015.01) | |
| *H04L 12/12* | (2006.01) | |

(52) U.S. Cl.
CPC ........... *H04L 12/12* (2013.01); *H04B 17/336* (2015.01)

(58) Field of Classification Search
CPC .............................. H04L 12/12; H04B 17/336
See application file for complete search history.

(56) References Cited

U.S. PATENT DOCUMENTS

| | | | | |
|---|---|---|---|---|
| 2010/0046543 A1* | 2/2010 | Parnaby | ................ | H04L 12/12 370/465 |
| 2014/0064422 A1* | 3/2014 | Zhang | ................ | H04L 7/0083 375/371 |
| 2022/0216978 A1* | 7/2022 | Fitzgerald | ............... | H04L 12/12 |

OTHER PUBLICATIONS

IEEE Std 802.3ch-2020 "IEEE Standard for Ethernet—Amendment 8: Physical Layer Specifications and Management Parameters for 2.5 Gb/s, 5 Gb/s, and 10 Gb/s Automotive Electrical Ethernet," IEEE Computer Society, pp. 1-207 (Jun. 30, 2020).

"OPEN Sleep/Wake-up Specification—Sleep/Wake-up Specification for Automotive Ethernet," OPEN Alliance, pp. 1-17 (Feb. 21, 2017).

Dhanuka et al., "How to Use Energy Efficient Ethernet (IEEE 802.3az) With Texas Instruments Ethernet PHYs," Texas Instruments, pp. 1-15 (Oct. 2019).

* cited by examiner

*Primary Examiner* — Derrick V Rose

(57) ABSTRACT

A physical layer (PHY) processor of a network interface device operates in a low power state in which a transceiver of the PHY processor device periodically does not transmit on a communication link during a plurality of quiet time slots. In response to determining a low signal-to-noise ratio (SNR) condition associated with the communication link, the PHY processor transitions to a link recovery state in which the transceiver continuously transmits idle symbols. In response to determining that the low SNR condition has ended, the PHY processor transitions from the link recovery state to the low power state.

23 Claims, 6 Drawing Sheets

*Prior Art*

*Prior Art*

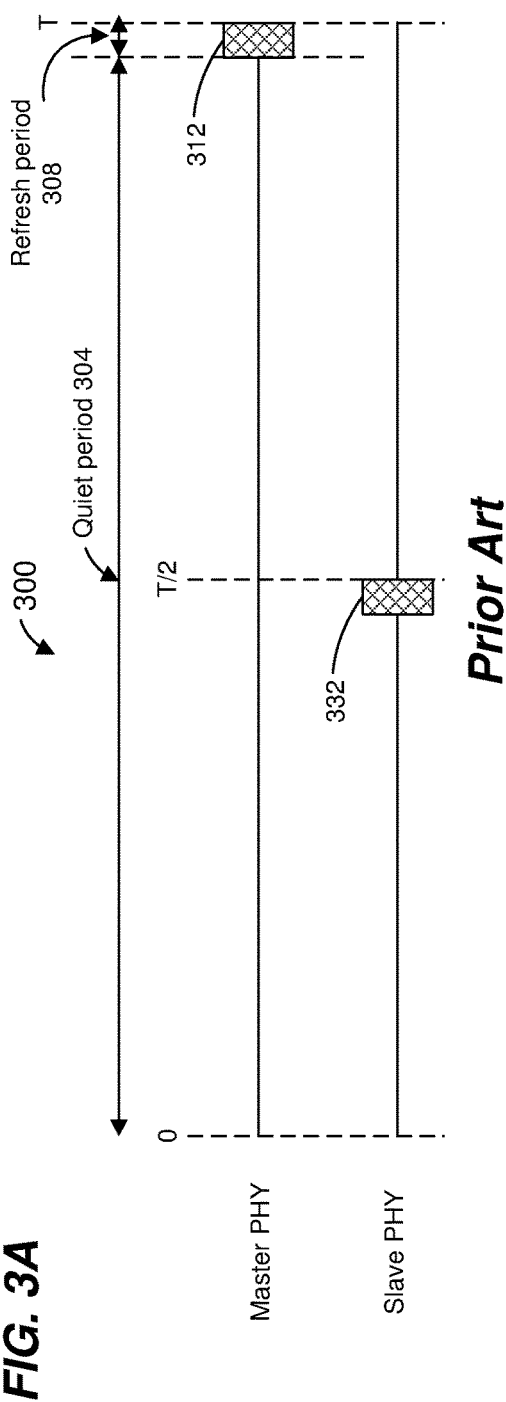
*FIG. 3A* *Prior Art*
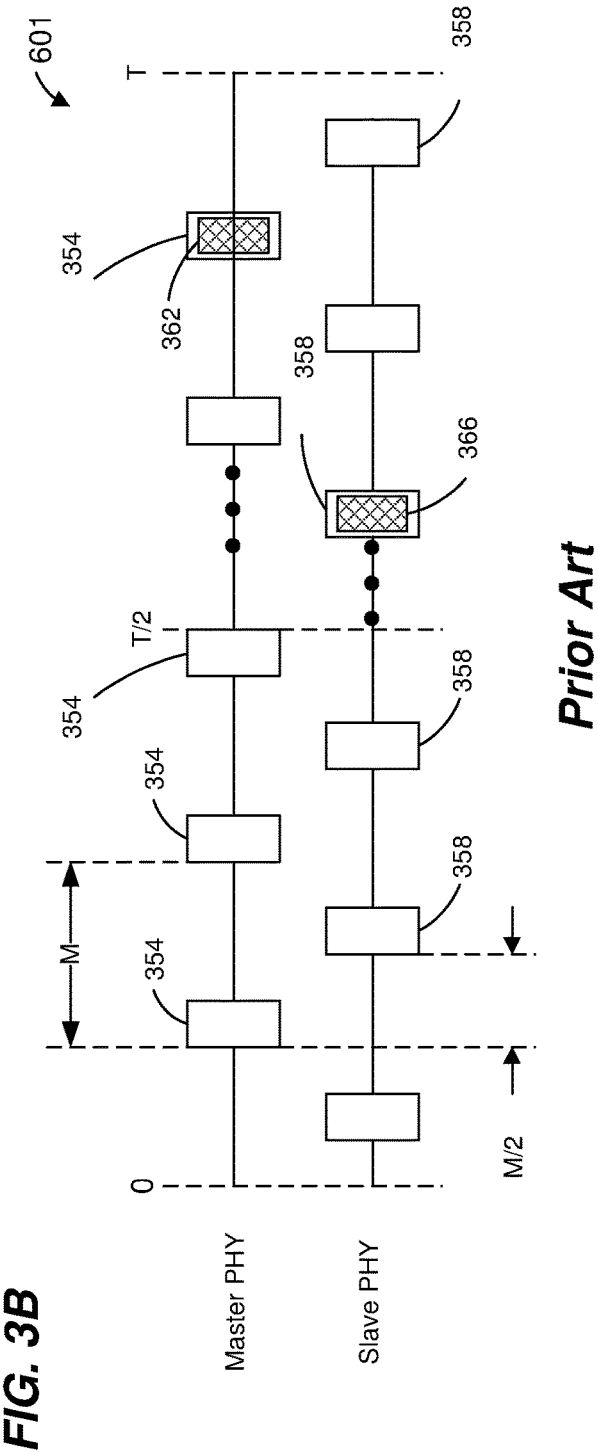
*FIG. 3B* *Prior Art*

ENERGY EFFICIENT ETHERNET (EEE) LINK RECOVERY FROM LOW SNR

CROSS REFERENCES TO RELATED APPLICATIONS

This application claims the benefit of U.S. Provisional Patent App. No. 63/057,763, entitled "Method for Improved Power Savings During Energy Efficient Ethernet (EEE) After Recover from Low-SNR Conditions," filed on Jul. 28, 2020, the disclosure of which is hereby expressly incorporated herein by reference in its entirety.

FIELD OF TECHNOLOGY

The present disclosure relates generally to communication technology, and more particularly to power saving techniques for communications.

BACKGROUND

The IEEE 802.3ch™ Standard, Institute for Electrical and Electrical Engineers (IEEE), pp. 1-207, Jun. 30, 2020 ("IEEE Std 802.3ch™-2020"), describes a feature, referred to as Energy Efficient Ethernet (EEE), that reduces power consumption during periods in which a transmitter does not need to transmit data. For example, when the transmitter does not need to transmit data via a communication link, the transmitter transitions the communication link from a normal operation mode to a low power idle (LPI) mode of operation. During the LPI mode, the transmitter and the receiver operate in a repeating quiet-refresh cycle in which the transmitter transmits nothing during periodic time periods (referred to as "quiet time periods"), and transmits refresh symbols during other periodic time periods (referred to as "refresh time periods"). Because nothing is transmitted during the quiet time periods, power consumption is reduced at the transmitter. Similarly, the receiver may also go to sleep during the quiet time periods to reduce power consumption. Transmission of the refresh symbols during the refresh time periods permits the receiver to maintain clock synchronization and to adapt filters (e.g., equalization filters) of the receiver.

In some situations, however, clock synchronization and/or filter adaptation at the receiver during the LPI mode may begin to degrade, which causes a signal-to-noise ratio (SNR) at the receiver to decrease. To address such degradation in clock synchronization and/or filter adaptation at the receiver during the LPI mode, IEEE Std 802.3ch™-2020 describes a feature in which the receiver, during the LPI mode, informs the transmitter of a low SNR condition and, in response, the transmitter transitions from the LPI mode to a recovery state in which the transmitter continuously transmits idle symbols. The continuous transmission of idle symbols allows the receiver to improve clock synchronization and/or filter adaptation, which improves the SNR. However, the continuous transmission of idle symbols results in significantly more power consumption at both the transmitter and the receiver as compared to the LPI mode.

According to IEEE Std 802.3ch™-2020, when the transmitter enters the recovery state, the transmitter remains in the recovery state until the transmitter determines that the transmitter has data to transmit to the receiver and, in response, transitions to the normal operation mode in which the transmitter sends a wake signal to the receiver and begins transmitting data to the receiver.

SUMMARY

In an embodiment, a network interface device comprises a physical layer (PHY) processor configured to perform PHY functions associated with a communication link. The PHY processor includes a transceiver and a controller configured to: operate the PHY processor in a low power state in which the transceiver periodically does not transmit on the communication link during a plurality of quiet time slots; in response to determining a low signal-to-noise ratio (SNR) condition associated with the communication link, transition the PHY processor to a link recovery state, wherein operation in the link recovery state includes the PHY processor transmitting idle symbols on the communication link; and in response to determining that the low SNR condition has ended, transition the PHY processor from the link recovery state to the low power state.

In another embodiment, a method for maintaining a communication link includes: operating a network interface device in a low power state in which the network interface device periodically does not transmit on the communication link during a plurality of quiet time slots; in response to determining a low SNR condition associated with the communication link, transitioning the network interface device to a link recovery state, wherein operation in the link recovery state includes the network interface device transmitting idle symbols on the communication link; and in response to determining that the low SNR condition has ended, transitioning the network interface device from the link recovery state to the low power state.

BRIEF DESCRIPTION OF THE DRAWINGS

FIG. 3A is a diagram of example signals transmitted/received by a master PHY processing device and a slave PHY processing device during a low power state, according to an embodiment.

FIG. 3B is a diagram of an example quiet/refresh cycle in a low power state, according to an embodiment.

DETAILED DESCRIPTION

As discussed above, IEEE Std 802.3ch™-2020 specifies that, after a transmitter transitions to the recovery state (in which the transmitter continuously transmits idle symbols), the transmitter will remain in the recovery state until the transmitter determines that the transmitter has data to transmit to the receiver. In response, the transmitter transitions to a normal operation mode in which the transmitter sends a wake signal to the receiver and begins transmitting data to the receiver. As a result, the transmitter may remain in the recovery state for a significant amount of time even after SNR has improved at the receiver. As further discussed above, the continuous transmission of idle symbols results in significantly more power consumption at both the transmitter and the receiver as compared to the LPI mode.

In various embodiments described below, a transmitter operating in a recovery state transitions to a low power state in response to determining that a low SNR condition has ended, thus avoiding the situation described above in which the transmitter remains in the recovery state for a potentially significant amount of time even when the low SNR condition has ended. Because the transmitter avoids remaining in the recovery state for a potentially significant amount of time even when the low SNR condition has ended, power consumption is reduced as compared to the method specified by IEEE Std 802.3ch™-2020.

Figure 1:
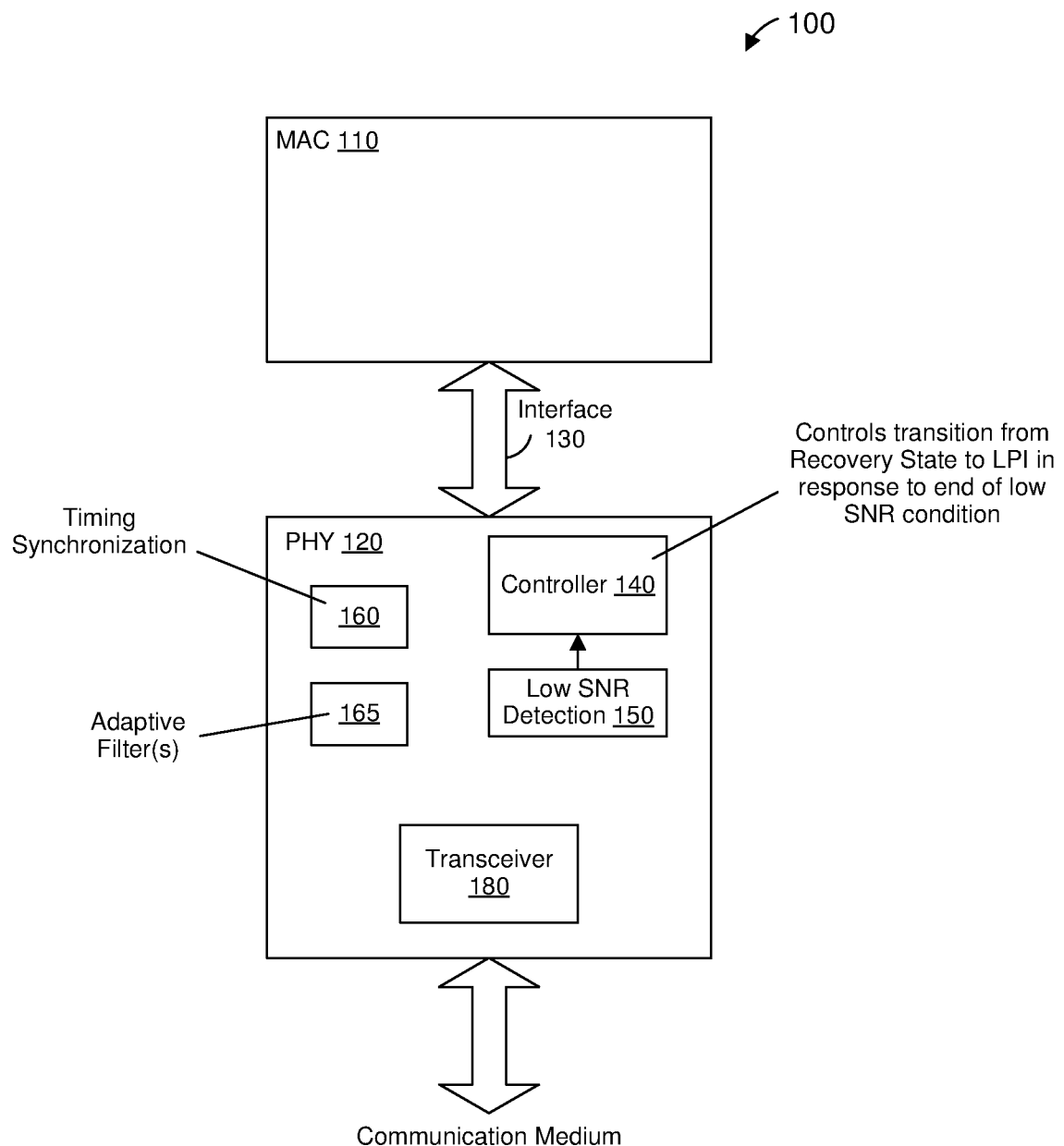
FIG. 1 is a simplified block diagram of an example network interface device that is configured to transition from a link recovery state to a low power state, according to an embodiment.

FIG. 1 is a block diagram of an example network interface device 100, according to an embodiment. The network interface device 100 includes at least a media access control (MAC) processing device 110 and a physical layer (PHY) processing device 120. In some embodiments, the MAC processing device 110 and the PHY processing device 120 are compliant with the IEEE 802.3 Ethernet Standard, except as otherwise disclosed below. In other embodiments, the MAC processing device 110 and the PHY processing device are compliant with another suitable communication protocol.

The MAC processing device 110 is configured to perform MAC layer functions associated with a communication protocol such as the communication protocol defined by the IEEE 802.3 Ethernet Standard or another suitable communication protocol. Similarly, the PHY processing device 120 is configured to perform PHY functions associated with a communication protocol such as the communication protocol defined by the IEEE 802.3 Ethernet Standard (except as otherwise disclosed below) or another suitable communication protocol.

In an embodiment the MAC processing device 110 comprises a processor (not shown) and a memory (not shown) coupled to the processor, where the processor is configured to execute machine readable instructions stored in the memory. In an embodiment, the memory stores machine readable instructions that, when executed by the processor, cause the processor to perform MAC layer functions associated with a communication protocol such as the communication protocol defined by the IEEE 802.3 Ethernet Standard or another suitable communication protocol.

In another embodiment the MAC processing device 110 additionally or alternatively comprises a hardware state machine (not shown) configured to perform MAC layer functions associated with a communication protocol such as the communication protocol defined by the IEEE 802.3 Ethernet Standard or another suitable communication protocol.

The MAC processing device 110 is communicatively coupled to the PHY processing device 120 via a communication interface 130 such as a 10 Gigabit Media Independent Interface (XGMII). In other embodiments, the MAC processing device 110 is communicatively coupled to the PHY processing device 120 via another suitable communication interface such as another suitable media independent interface (e.g., the reduced media-independent interface (RMII), the Gigabit Media Independent Interface (GMII), the reduced gigabit media-independent interface (RGMII), the serial gigabit media-independent interface (SGMII), the high serial gigabit media-independent interface (HSGMII), the quad serial gigabit media-independent interface (QSG-MII), etc.), according to some embodiments.

In an embodiment, the MAC processing device 110 provides data for transmission to the PHY processing device 120 via the interface 130. In response to receiving the data from the MAC processing device 110, the PHY processing device 120 encodes, scrambles, and modulates the data to generate a transmission signal for transmitting the data via a suitable communication medium such as a wired, optical, or wireless communication medium.

In an embodiment, the PHY processing device 120 also receives a receive signal via the communication medium, and demodulates, de-scrambles, and decodes data in the receive signal to generate received data. Additionally, the PHY processing device 120 provides at least some of the received data to the MAC processing device 110 via the interface 130.

The PHY processing device 120 includes one or more encoder devices (not shown), a scrambler device (not shown), and a modulator (not shown) for encoding, scrambling, and modulating data as part of generating a transmission signal, according to an embodiment. The PHY processing device 120 also includes a demodulator (not shown), a de-scrambler device (not shown), and one or more decoder devices (not shown) for demodulating, de-scrambling, and decoding as part of generating the received data, according to an embodiment. In some embodiments, the PHY processing device 120 also includes an analog to digital converter (hereinafter "ADC", not shown) that converts an analog signal received via the communication medium to a digital signal. In some embodiments, the PHY processing device 120 also includes a digital signal processor (hereinafter "DSP", not shown) that processes the digital signal to generate a signal corresponding to modulation symbols that are then demodulated by the demodulator (not shown).

In some embodiments, the PHY processing device 120 is configurable as either a master PHY processing device or a slave PHY processing device. A master PHY processing device uses a free running local clock to determine the timing of transmitter operations, according to an embodiment. A slave PHY processing device recovers the clock from the signal received from the master PHY processing device and uses the received signal to determine the timing of transmitter operations, according to an embodiment. Furthermore, the master PHY processing device and the slave PHY processing device are configured to synchronize their clocks and timing of transmitter operations during a training mode before entering a normal data transmission mode.

The PHY processing device 120 includes a controller 140 that is configured to control operation of the PHY processing device 120 according to various operating states and/or modes and to control transitioning between the operating states and/or modes. For example, as will be described in more detail below, the controller 140 is configured to control the PHY processing device 120 to transition from operating in a recovery state to operating in a low power state in response to determining that a low SNR condition has ended. As discussed above, permitting such a transition reduces power consumption by the PHY processing device 120, according to some embodiments.

In an embodiment, the controller 140 comprises a hardware state machine in which at least some states of the hardware state machine generally correspond to at least some of the various operating states and/or modes of the PHY processing device 120. The hardware state machine is configured to generate control signals that control operation of the PHY processing device 120 according to various operating states and/or modes, and to transition between states of the hardware state machine in response to receiving signal and/or information. As an illustrative example, the hardware state machine is configured to transition from a first state machine state corresponding to a recovery state to a second state machine state corresponding to a low power state in response to receiving signal(s) and/or information that indicates a low SNR condition has ended.

In another embodiment, the controller 140 comprises a processor that executes machine readable instructions that causes the processor to implement a state machine similar to the hardware state machine described above.

The PHY processing device 120 also includes low SNR detection circuitry 150 that is configured to detect whether a low SNR condition exists and to signal to the controller 140 whether the low SNR condition exists. In some embodiments, the low SNR detection circuitry 150 includes circuitry configured to measure SNR associated with a receive signal, compare the measured SNR to a threshold, and determine whether a low SNR condition exists based on whether the measured SNR is below the threshold. In some embodiments, the low SNR detection circuitry 150 additionally or alternatively includes circuitry configured to determine a bit error rate associated with the receive signal, compare the measured bit error rate to a threshold, and determine whether a low SNR condition exists based on whether the measured bit error rate SNR is above the threshold. In some embodiments, the low SNR detection circuitry 150 additionally or alternatively includes circuitry configured to determine a packet error rate associated with the receive signal, compare the measured packet error rate to a threshold, and determine whether the low SNR condition exists based on whether the measured packet error rate SNR is above the threshold. In other embodiments, the low SNR detection circuitry 150 determines whether the low SNR condition exists additionally or alternatively based on one or more other suitable parameters that indicate whether SNR associated with the receive signal is below or above a particular SNR level, and comparing the one or more other suitable parameters to one or more respective thresholds.

In an embodiment, upon receiving an indication of a low SNR condition from the low SNR detection circuitry 150, the controller 140 controls the PHY processing device 120 to transmit an indication of the low SNR condition to the link partner via the communication medium. In an embodiment, upon receiving an indication from the low SNR detection circuitry 150 that the low SNR condition no longer exists, the controller 140 controls the PHY processing device 120 to transmit an indication that the low SNR condition no longer exists to the link partner via the communication medium.

Similarly, in an embodiment, the controller 140 is configured to determine that the link partner is experiencing a low SNR condition by receiving an indication that the low SNR condition exists from the link partner via the communication medium. In an embodiment, the controller 140 is configured to determine that the link partner is no longer experiencing a low SNR condition by receiving an indication that the low SNR condition no longer exists from the link partner via the communication medium.

At least in embodiments in which the PHY processing device 120 is a slave PHY processing device or is configurable to operate as a slave PHY processing device, the PHY processing device 120 includes timing synchronization circuitry 160 that is configured to synchronize timing of the PHY processing device 120 with timing of a master PHY processing device. In an embodiment, the timing synchronization circuitry 160 is configured to synchronize a clock of the PHY processing device 120 with a clock of the master PHY processing device. In an embodiment, the timing synchronization circuitry 160 includes phased-locked loop (PLL) circuitry configured to synchronize the clock of the PHY processing device 120 with the clock of the master PHY processing device. In other embodiments, the timing synchronization circuitry 160 additionally or alternatively includes other suitable circuitry, other than PLL circuitry, suitable for synchronizing the clock of the PHY processing device 120 with the clock of the master PHY processing device.

The PHY processing device 120 further includes one or more adaptive filters 165 that are configured to filter signal (s) corresponding to the signal received by the PHY processing device 120 via the communication medium. In an embodiment in which the PHY processing device 120 includes an ADC, the one or more adaptive filters 165 includes one or more adaptive analog filters that filter an analog signal prior to the ADC converting the analog signal to a digital signal. In another embodiment, the one or more adaptive filters 165 additionally or alternatively includes one or more adaptive digital filters that filter a digital signal after the ADC converted the analog signal to the digital signal. In an embodiment in which the PHY processing device 120 includes a DSP, at least one of the one or more adaptive digital filters are implemented by the DSP.

The PHY processing device 120 also comprises a transceiver 180. The transceiver is configured to transmit and receive via the communication medium, according to an embodiment.

Figure 2A:
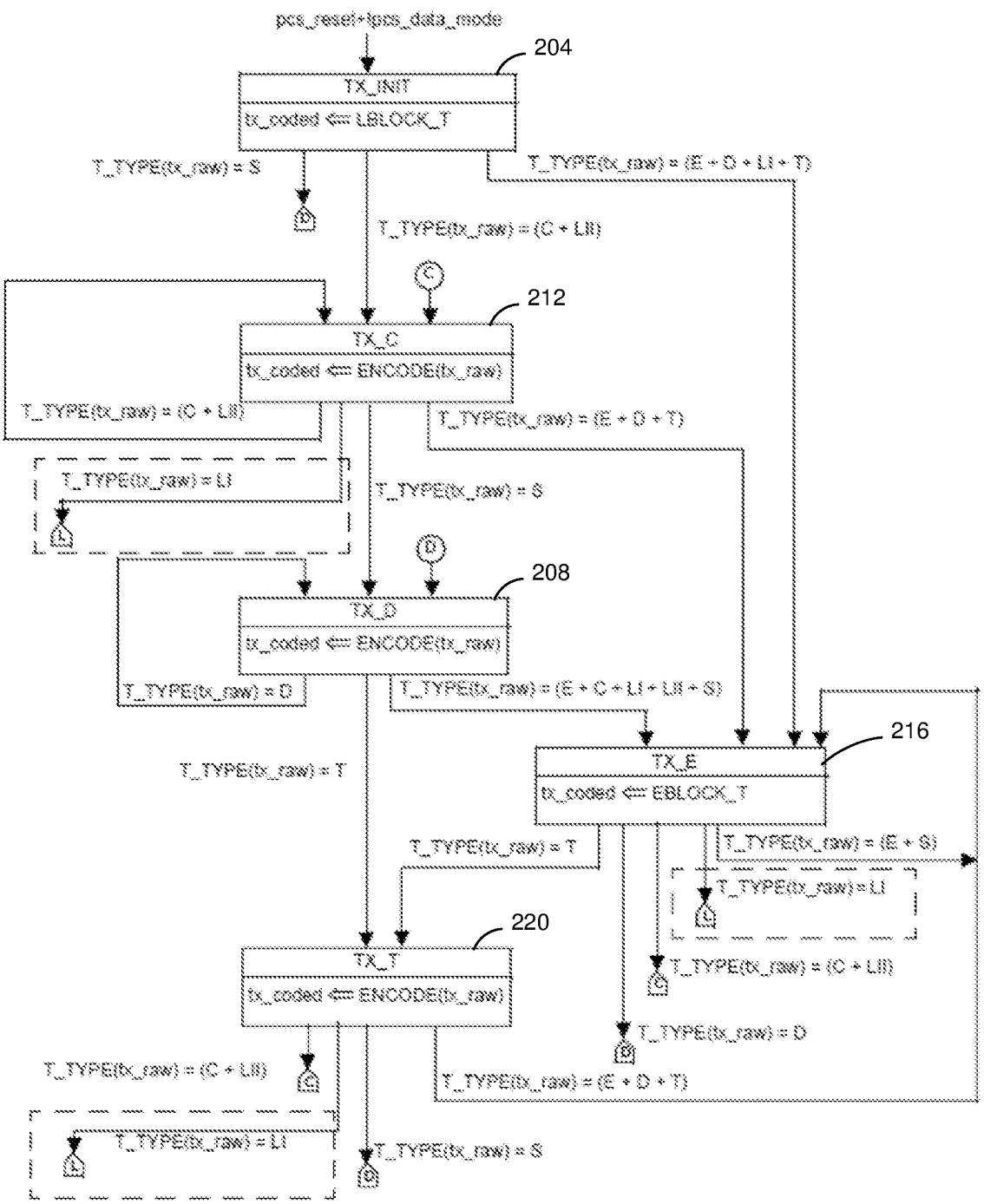
FIGS. 2A-B illustrate state diagrams set forth in IEEE Std 802.3ch™-2020, and depict states and state transitions for transmit operations for a physical layer (PHY) processing device.
Figure 2B:
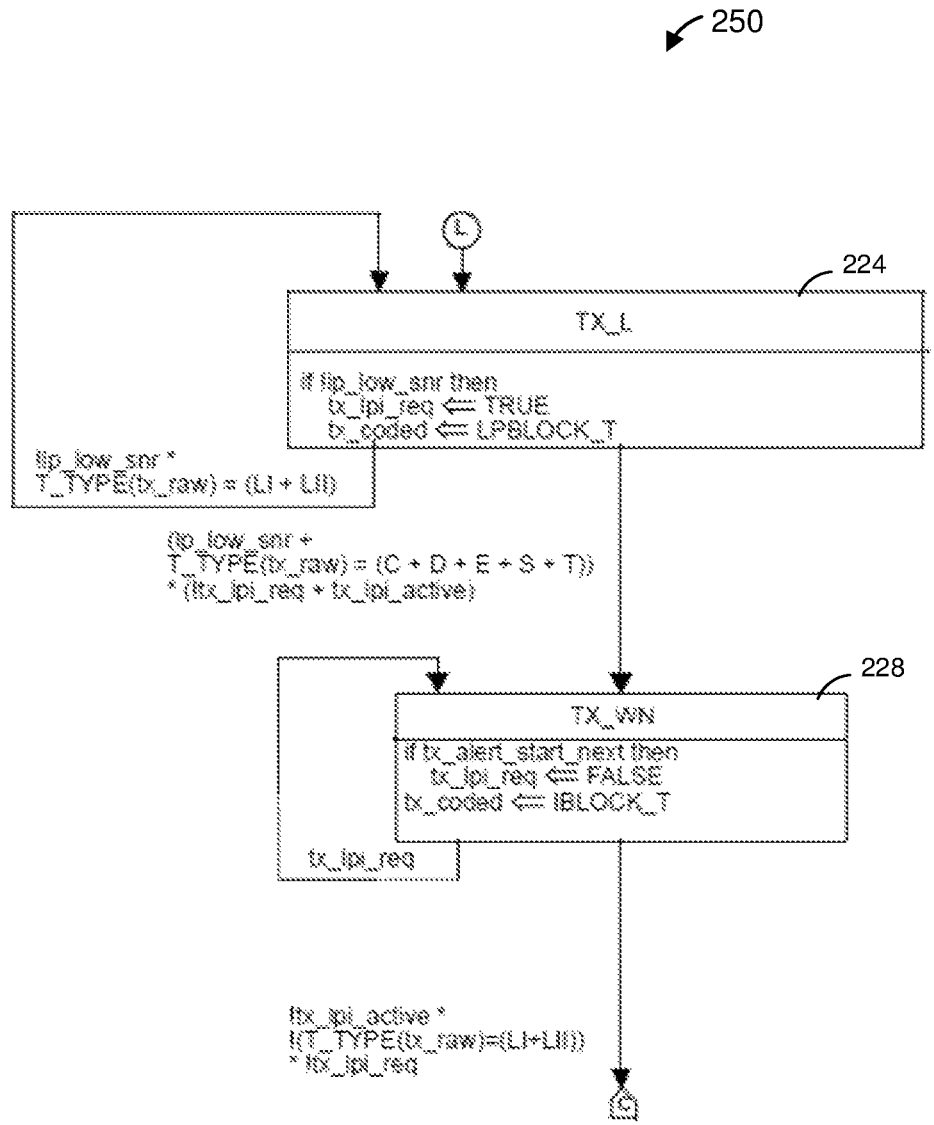

As discussed above, the PHY processing device 120 operates in various operating states and/or modes, according to some embodiments. FIGS. 2A-B are state diagrams set forth in IEEE Std 802.3ch™-2020 illustrating states and state transitions for transmit operations for a PHY processing device. In an embodiment, the PHY processing device 120 is configured to function according to the state diagram 200, and FIGS. 2A-B are described with reference to FIG. 1 for ease of explanation. In other embodiments, the PHY processing device 120 is configured to function according to another suitable state diagram. Additionally, in other embodiments, a suitable PHY processing device other than the PHY processing device 120 is configured to function according to the state diagram 200.

The description of FIGS. 2A-B below is simplified for purposes of brevity. A more complete description of the state diagrams of FIGS. 2A-B is provided in IEEE Std 802.3ch™-2020, which is incorporated herein by reference.

In a transmit initialization state (TX_INIT) 204, the PHY processing device 120 initializes transmit circuitry such as encoders, the scrambler, the timing synchronization circuitry 160 (e.g., when operating as a slave device), the adaptive filter(s) 165, etc. After initializing the transmit circuitry, the PHY processing device 120 performs training (e.g., the timing synchronization circuitry 160 (if included) performs timing synchronization functions and/or the adaptive filter (s) 165 are trained, etc.) in connection with synchronizing with a link partner via the communication medium. The PHY processing device 120 enters the transmit initialization state 204 upon startup, after a device reset, etc. The PHY processing device 120 leaves the transmit initialization state 204 in connection with the PHY processing device 120 completing training and receiving information from the MAC processing device 110 via the interface 130, as will be described in more detail below.

The PHY processing device 120 transitions from the transmit initialization state 204 to various other states illustrated in FIG. 2A depending on the type of information received from the MAC processing device 110. For example, the information received from the MAC processing device 110 includes i) control information corresponding to a MAC layer and/or a PHY layer in a communication protocol stack, and ii) data generated by one or more layers above the MAC layer in the communication protocol stack (in contrast, the PHY layer is below the MAC layer in the communication protocol stack), according to some embodiments. The data generated by one or more layers above the MAC layer in the communication protocol stack is referred to herein as "user data" for purposes of brevity.

IEEE Std 802.3ch™-2020 defines various control characters such as a start control character (/S/), which is used to indicate a start of a packet; a terminate control character (/T/), which is used to indicate an end of a packet; an error control character (/E/), which indicates data received by the PHY processing device 120 in error; an idle control character (/I/); an ordered set control character (/O/), which indicates a start of an ordered set (control information); and a low power idle control character (/LI/). The MAC processing device 100 transmits low power idle control characters to the PHY processing device 120 to signal to the PHY processing device 120 a request to enter a low power mode of operation. During the low power mode, the PHY processing device 120 transmits low power idle control characters via the communication medium to maintain the communication link with the link partner, as will be described in more detail below.

In response to receiving a start control character (/S/) from the MAC processing device 100 (T_Type(tx_raw)=S), the PHY processing device 120 transitions from state 204 to a state 208. At state 208, the PHY processing device 120 generates a transmit signal using user data received from the MAC processing device 100 (e.g., including encoding and modulating), and transmits the transmit signal via the communication medium. The PHY processing device 120 remains in the state 208 while the PHY processing device 120 continues to receive user data from the MAC processing device 100 (T_Type(tx_raw)=D).

Referring again to state 204, in response to receiving, within a bit vector from the MAC processing device 100, one of i) eight valid control characters other than/O/, /S/, /T/, /E/, and/LI/, ii) one valid ordered set and four valid control characters other than /O/, /S/, and/T/, or iii) two valid ordered sets (T_Type(tx_raw)=(C+LII)), the PHY processing device 120 transitions from state 204 to a state 212. At state 212, the PHY processing device 120 generates a transmit signal using control information received from the MAC processing device 100 (e.g., including encoding and modulating), and transmits the transmit signal via the communication medium. The PHY processing device 120 remains in the state 212 while the PHY processing device 120 continues to receive, within a bit vector from the MAC processing device 100, one of i) eight valid control characters other than/O/, /S/, /T/, /E/, and/LI/, ii) one valid ordered set and four valid control characters other than/O/, /S/, and/T/, or iii) two valid ordered sets (T_Type(tx_raw)=(C+LII)).

Referring again to state 204, in response to receiving, within a bit vector from the MAC processing device 100, i) user data, ii) eight/LI/characters, iii) a termination control character (/T/), and/or iv) otherwise invalid information (T_Type(tx_raw)=(E+D+Li+T)), the PHY processing device 120 transitions from state 204 to a state 216. State 216 generally corresponds to an error condition, and transition to state 216 from other states occurs when error conditions occur, such as receiving invalid information from the MAC processing device 100 and/or receiving information from the MAC processing device 100 in an incorrect order, such as receiving user data without first receiving a start control character (/S/), receiving a termination control character (/T/) without first receiving a start control character (/S/). At state 216, the PHY processing device 120 generates a transmit signal using error control characters (e.g., including encoding and modulating), and transmits the transmit signal via the communication medium. The PHY processing device 120 remains in the state 216 while the PHY processing device 120 receives, within a bit vector from the MAC processing device 100, i) a start control character (/S/) or ii) otherwise invalid information (T_Type (tx_raw)=(E+S)).

On the other hand, in response to receiving user data from the MAC processing device 100 (T_Type(tx_raw)=D), the PHY processing device 120 transitions from state 216 to state 208.

Referring again to state 216, in response to receiving, within a bit vector from the MAC processing device 100, one of i) eight valid control characters other than/O/, /S/, /T/, /E/, and/LI/, ii) one valid ordered set and four valid control characters other than /O/, /S/, and/T/, or iii) two valid ordered sets (T_Type(tx_raw)=(C+LII)), the PHY processing device 120 transitions from state 216 to state 212.

Referring again to state 216, in response to receiving, within a bit vector from the MAC processing device 100, a termination character (/T/), the PHY processing device 120 transitions from state 216 to a state 220. At state 216, the PHY processing device 120 generates a transmit signal using the information received from the MAC processing device 100 (e.g., including encoding and modulating), and transmits the transmit signal via the communication medium. The PHY processing device 120 then transitions to another state depending on the data received from the MAC processing device 100 in a next a bit vector.

For example, in response to receiving a start control character (/S/) from the MAC processing device 100 (T_Type(tx_raw)=S), the PHY processing device 120 transitions from state 220 to state 208. In response to receiving, within a bit vector from the MAC processing device 100, one of i) eight valid control characters other than/O/, /S/, /T/, /E/, and/LI/, ii) one valid ordered set and four valid control characters other than /O/, /S/, and/T/, or iii) two valid ordered sets (T_Type(tx_raw)=(C+LII)), the PHY processing device 120 transitions from state 220 to state 212. In response to receiving, within a bit vector from the MAC processing device 100, i) user data, ii) a termination control character/T/, and/or iii) otherwise invalid information, the PHY processing device 120 transitions from state 220 to state 216.

Referring now to states 212, 216, and 220 (FIG. 2A), in response to receiving, within a bit vector from the MAC processing device 100, eight low power idle control characters (/LI/), the PHY processing device 120 transitions to state 224 (FIG. 2B). State 224 generally corresponds to a low power mode of operation (sometimes referred to herein as a low power idle (LPI) mode), which will be described in more detail below. The PHY processing device 120 remains in state 224 while the PHY processing device 120 continues to receive low power idle control characters (/LI/) from the MAC processing device 100 and a low SNR condition does not exist (!lp_low_snr*T-TYPE(tx_raw)=(LI+LII)). On the other hand, if a low SNR condition is detected, the PHY processing device 120 transitions to a state 228. For example, if the PHY processing device 120 receives an indication of a low SNR condition from the link partner via the communication medium, the controller 140 causes the PHY processing device 120 to transition to the state 228, according to an embodiment.

The state 228 corresponds to a recovery state, which will be described in more detail below. Upon transition to the state 228, the PHY processing device 120 transmits a wake signal to the link partner (e.g., during an alert window (described below), during a refresh period (described below), etc.) to prompt the PHY processing device of the link partner to exit the LPI mode. After transmitting the wake signal, the PHY processing device 120 generates a transmit signal corresponding to the continuous transmission of idle symbols via the communication medium during the state 228. The continuous transmission of idle symbols permits the link partner to better synchronize to timing of the PHY processing device 120 and to further adjust adaptive filters of the link partner in an attempt to improve SNR. If the MAC processing device 100 continues sending low power idle control characters (/LI/) to the PHY processing device 120, the PHY processing device 120 remains in the state 228 irrespective of whether the low SNR condition still exists. For example, if the PHY processing device 120 receives, while in the state 228, an indication from the link partner that the low SNR condition has ended, the PHY processing device 120 will remain in the state 228 and continue to transmit idle symbols. In order to leave the state 228, the PHY processing device 120 must receive information from the MAC processor 110 via the interface 130 indicating that the MAC processor 110 wants the PHY processing device 120 to exit the LPI mode, such as the MAC processor 110 sending control characters other than low power idle characters (/LI/) or data characters. In response to receive information from the MAC processor 110 via the interface 130 indicating that the MAC processor 110 wants the PHY processing device 120 to exit the LPI mode, the PHY processing device 120 transitions to the state 212. Thus, in some situations, the PHY processing device 120 remains in the state 228 for a significant amount of time even though the low SNR condition no longer exists.

FIG. 3A is a diagram of signals transmitted/received by a master PHY processing device and a slave PHY processing device during a low power mode (e.g., an LPI mode), according to an embodiment. More specifically, FIG. 3A is diagram of an example quiet/refresh cycle 300. In some embodiments, the PHY processing device 120 of FIG. 1 and a corresponding link partner operate according to the quiet/refresh cycle 300, and FIG. 3A is described with reference to FIG. 1 for explanatory purposes. In other embodiments, however, other suitable network interface devices operate according to the quiet/refresh cycle of FIG. 3A. In some embodiments, the PHY processing device 120 is configured as a master PHY processing device, and the link partner of the PHY processing device 120 is configured as a slave PHY processing device. In other embodiments, the PHY processing device 120 is configured as the slave PHY processing device, and its link partner is configured as the master PHY processing device.

The LPI includes multiple repeating quiet/refresh cycles such as illustrated in FIG. 3A. The quiet/refresh cycle 300 has a duration T and includes a quiet period 304 and a refresh period 308. In an embodiment, the quiet time period 304 is significantly longer than the refresh period. For example, a length of the quiet time period 304 is at least 90 times a length of the refresh period.

During the quiet period 304, the master PHY processing device does not transmit (according to an embodiment), whereas during the refresh period, the master PHY processing device transmits a refresh signal 312 comprising refresh symbols. The slave PHY processing device receives the refresh signal 312 and uses the refresh symbols to synchronize to the timing of the master PHY processing device and adjust adaptive filters of the slave PHY processing device.

The slave PHY processing device similarly operates in a quiet period/refresh period that is offset from the quiet period 304/refresh period 308 by T/2. For example, the slave PHY processing device does not transmit (according to an embodiment) during the corresponding quiet period, whereas during the refresh period, the slave PHY processing device transmits a refresh signal 332 comprising refresh symbols. The master PHY processing device receives the refresh signal 332 and uses the refresh symbols to adjust adaptive filters of the slave PHY processing device. In some embodiments, the master PHY processing device also uses the refresh symbols from the slave PHY processing device to adjust timing of the master PHY processing device to improve SNR. In other embodiments, the master PHY processing device does not use the refresh symbols from the slave PHY processing device to adjust the timing of the master PHY processing device.

In some embodiments, the PHY processing device 120 transmits information regarding the communication link to the link partner during the refresh period. For example, when the low SNR detection circuitry 150 of the PHY processing device 120 detects a low SNR condition, the controller 140 controls the PHY processing device 120 to transmit an indication of the low SNR condition to the link partner during the refresh period. Similarly, in some embodiments, the PHY processing device 120 receives information regarding the communication link from the link partner during the refresh period. For example, the PHY processing device 120 may receive an indication of a low SNR condition from the link partner during the refresh period.

The quiet/refresh cycle 300 includes designated windows (referred to herein as "alert windows") in which the master PHY processing device and the slave master PHY may transmit a signal (referred to herein as an "alert signal") to signal a request to exit the LPI mode. FIG. 3B is a diagram of an example quiet/refresh cycle 350 illustrating first alert windows 354 for the master PHY processing device and second alert windows 358 for the slave PHY processing device, according to an embodiment. In some embodiments, the PHY processing device 120 of FIG. 1 and a corresponding link partner operate according to the quiet/refresh cycle 350, and FIG. 3B is described with reference to FIG. 1 for explanatory purposes. In other embodiments, however, other suitable network interface devices operate according to the quiet/refresh cycle of FIG. 3B. In some embodiments, the PHY processing device 120 is configured as a master PHY processing device, and the link partner of the PHY processing device 120 is configured as a slave PHY processing device. In other embodiments, the PHY processing device 120 is configured as the slave PHY processing device, and its link partner is configured as the master PHY processing device.

When in the LPI mode, the master PHY processing device is configured to power up (at least some receiver circuitry) to be prepared to receive an alert signal in any of the first alert windows 354. Similarly, when in the LPI mode, the master PHY processing device is configured to power down (at least some receiver circuitry) when outside of the first alert windows 354. The master PHY processing device is configured to exit the LPI mode in response to receiving an alert signal is a first alert window 354, the alert signal having been transmitted by the slave PHY processing device. In FIG. 3B, the slave PHY processing device transmits an alert signal 362 in one of the first alert windows 354, as an illustrative example.

When in the LPI mode, the slave PHY processing device is configured to power up (at least some receiver circuitry) to be prepared to receive an alert signal in any of the second alert windows 358. Similarly, when in the LPI mode, the master PHY processing device is configured to power down (at least some receiver circuitry) when outside of the second alert windows 358. The slave PHY processing device is configured to exit the LPI mode in response to receiving an alert signal is a second alert window 358, the alert signal having been transmitted by the master PHY processing device. In FIG. 3B, the master PHY processing device transmits an alert signal 366 in one of the second alert windows 358, as an illustrative example.

Each of the first alert windows 354 and the second alert windows 358 have a time duration of M. The first alert windows 354 and the second alert windows 358 are staggered from one another so that an alert signal transmitted by the master PHY processing device will not overlap in time with transmission of an alert signal by the slave PHY processing device. In an embodiment, a start of a first alert window 354 occurs at a time M/2 before a start of a second alert window 358.

FIGS. 3A and 3B illustrate a scenario in which both directions of a communication link are operating according to the LPI mode. In some embodiments, only one direction of the communication link operates according to the LPI mode. For example, when the master PHY processing device does not have data to transmit to the slave PHY processing device but the slave PHY processing device has data to transmit to the master PHY processing device, transmit-side circuitry of the master PHY processing device may transition to the LPI mode (e.g., the master PHY processing device does not transmit during the quiet refresh period 304 and transmits the refresh signal 312 during the refresh period 308), whereas receive-side circuitry of the master PHY processing device remains in a normal operating mode to receive data from the slave PHY processing device. Similarly, when the transmit-side circuitry of the master PHY processing device transitions to the LPI mode, receive-side circuitry of the slave PHY processing device transitions to the LPI mode (e.g., receive-side circuitry of the slave PHY processing device goes to sleep except during alert windows 358 and/or during the refresh period 308), whereas transmit-side circuitry of the slave PHY processing device remains in a normal operating mode to transmit data to the master PHY processing device. As another example, when the slave PHY processing device does not have data to transmit to the master PHY processing device but the master PHY processing device has data to transmit to the slave PHY processing device, transmit-side circuitry of the slave PHY processing device may transition to the LPI mode (e.g., the slave PHY processing device does not transmit during the quiet refresh period and transmits the refresh signal 332 during the refresh period), whereas receive-side circuitry of the slave PHY processing device remains in a normal operating mode to receive data from the master PHY processing device. Similarly, when the transmit-side circuitry of the slave PHY processing device transitions to the LPI mode, receive-side circuitry of the master PHY processing device transitions to the LPI mode (e.g., receive-side circuitry of the master PHY processing device goes to sleep except during the alert windows 354 and/or during the refresh period), whereas transmit-side circuitry of the master PHY processing device remains in a normal operating mode to transmit data to the slave PHY processing device.

As discussed above, and as can be seen in FIG. 3A, there are significant time periods while transmit-side circuitry of the PHY processing device 120 is in the LPI mode (e.g., quiet periods) in which at least some transmit-side circuitry of the PHY processing device 120 can be shut down (or put to sleep, or otherwise put into a low power mode of operation) because nothing is being transmitted during the quiet periods (according to an embodiment; in other embodiments, transmit-side circuitry of the PHY processing device 120 does transmit during the quiet periods but at significantly reduced power, such as at least 2 (or 3, or 4, or 5, or 10, or 20, or 50, etc.) times less power as compared to transmitting idle symbols, for example). Similarly, as discussed above and as can be seen in FIG. 3B, there are significant time periods while receive-side circuitry of the PHY processing device 120 is in the LPI mode in which at least some receive-side circuitry of the PHY processing device 120 can be shutdown (or put to sleep or otherwise put into a low power mode of operation) because the link partner will not transmit outside of the alert windows 354, 358 and the refresh period 308.

On the other hand, the PHY processing device 120 continuously transmits idle symbols during the recovery state 228, as discussed above. Thus, power consumption at both the PHY processing device 120 and the link partner increases significantly in the recovery state 228 as compared to the LPI mode (e.g., state 224 of FIG. 3B).

Figure 4:
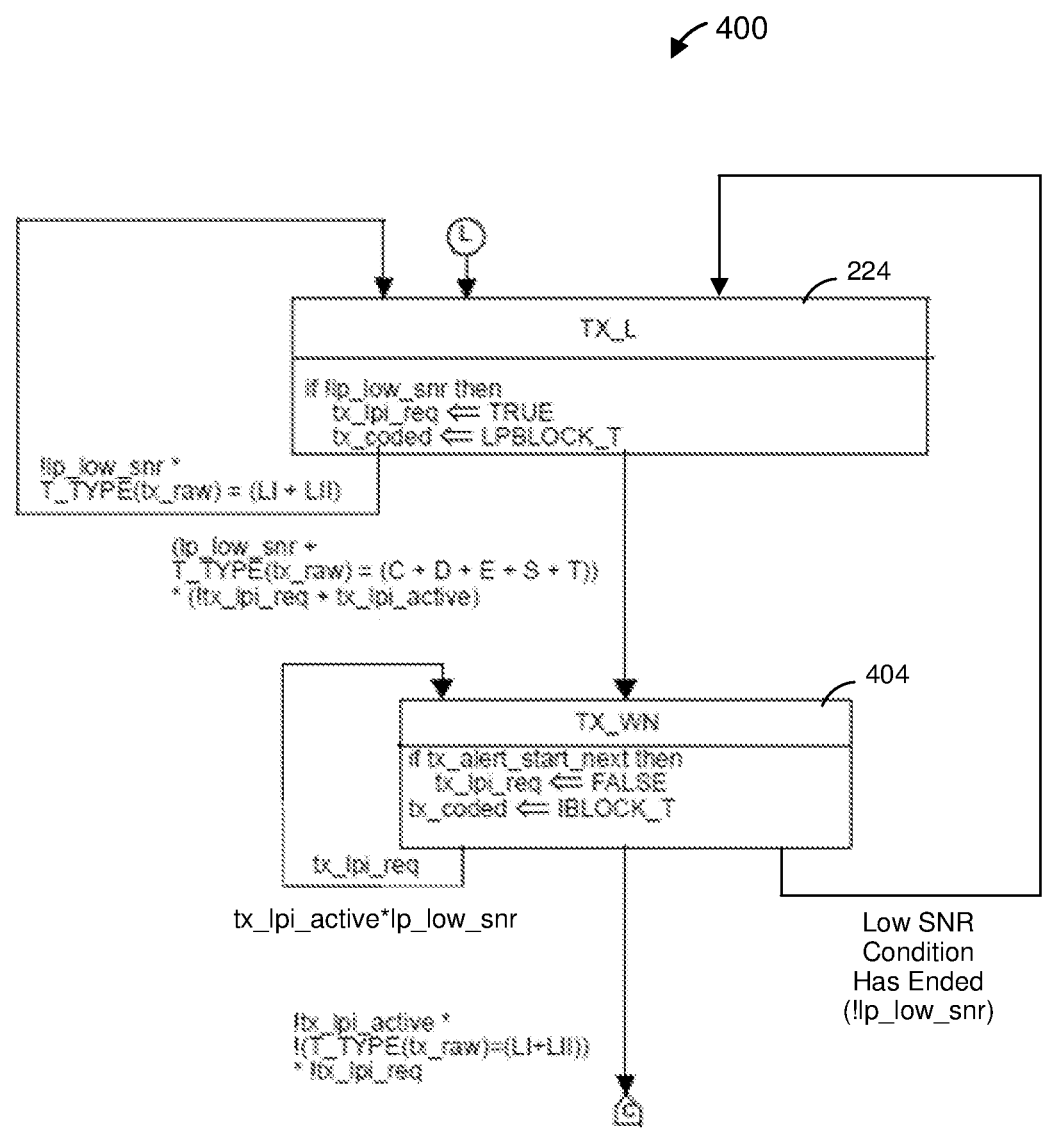
FIG. 4 is a state diagram illustrating example states and state transitions for transmit operations for a PHY processing device, according to an embodiment.

FIG. 4 is a state diagram 400 illustrating states and state transitions for transmit operations for a PHY processing device, according to an embodiment. In an embodiment, the PHY processing device 120 is configured to function according to the state diagram 400, and FIG. 4 is described with reference to FIG. 1 for ease of explanation. In other embodiments, the PHY processing device 120 is configured to function according to another suitable state diagram. Additionally, in other embodiments, a suitable PHY processing device other than the PHY processing device 120 is configured to function according to the state diagram 400.

In an embodiment, the state diagram 400 generally corresponds to a modification of the state diagram 250 of FIG. 2B, and state diagram 400 of FIG. 4 operates in conjunction with the state diagram 200 of FIG. 2A. For example, the PHY processing device 120 transitions to state 224 in FIG. 4 from states 212, 216, and 220 (FIG. 2A) in the same manner as discussed above. In other embodiments, however, the state diagram 400 operates in conjunction with another suitable state diagram different than the state diagram 200 of FIG. 2A.

As discussed above, state 224 generally corresponds to an LPI mode. The PHY processing device 120 remains in state 224 while the PHY processing device 120 continues to receive low power idle control characters (/LI/) from the MAC processing device 100 and a low SNR condition does not exist (!lp_low_snr*T-TYPE(tx_raw)=(LI+LII)). On the other hand, if a low SNR condition is detected, the PHY processing device 120 transitions to a state 404. For example, if the PHY processing device 120 receives an indication of a low SNR condition from the link partner via the communication medium, the controller 140 causes the PHY processing device 120 to transition to the state 404, according to an embodiment.

The state 404 corresponds to a recovery state similar to the recovery state 228 discussed above. During the state 404, the PHY processing device 120 generates a transmit signal corresponding to the continuous transmission of idle symbols via the communication medium. The continuous transmission of idle symbols permits the link partner to better synchronize to timing of the PHY processing device 120 and to further adjust adaptive filters of the link partner in an attempt to improve SNR. If the MAC processing device 100 continues sending idle control characters (/LI/) to the PHY processing device 120 and the low SNR condition remains, the PHY processing device 120 remains in the state 228.

On the other hand, if the low SNR condition ends, the PHY processing device 120 transitions back to the state 224. For example, if the PHY processing device 120 receives from the link partner via the communication medium an indication that the low SNR condition has ended, the controller 140 causes the PHY processing device 120 to transition back to the state 224, according to an embodiment.

Similar to the state 228 of FIG. 2B, in response to receive information from the MAC processor 110 via the interface 130 indicating that the MAC processor 110 wants the PHY processing device 120 to exit the LPI mode, the PHY processing device 120 transitions to the state 212.

Unlike the state 228 of FIG. 2B, the state diagram 400 provides a mechanism for the PHY processing device 120 to transition back to the state 224 in response to the PHY processing device 120 determining that the low SNR condition has ended. For example, the PHY processing device 120 to transition from the state 404 back to the state 224 directly without having to first transition to any other state such as the states illustrated in FIG. 2A, according to an embodiment. Thus, in contrast with the state diagram 250 of FIG. 2B, the PHY processing device 120 can more quickly transition to the LPI 224 when the low SNR condition has ended, and thus less power is consumed as compared with the state diagram 250 of FIG. 2B.

In some embodiments, the PHY processing device 120 can transition from the state 404 back to the state 224 without being prompted by the MAC processing device 110, according to an embodiment. Thus, at least one or more portions of the MAC processing device 110 related to transit-side operations can remain in a sleep mode and further reduce power consumption, as compared to requiring such portion(s) of the MAC processing device 110 to wake up and prompt the PHY processing device 120 to transition from the state 404 back to the state 224.

Figure 5:
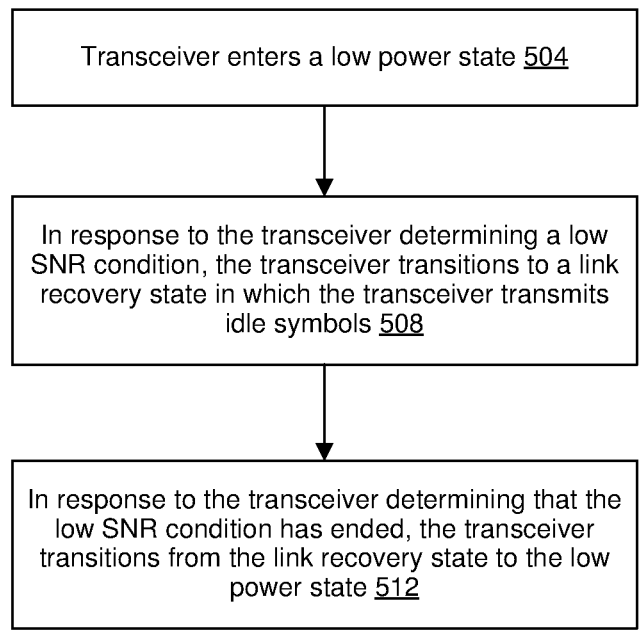
FIG. 5 is a flow diagram of an example method for maintaining a communication link, according to an embodiment.

FIG. 5 is a flow diagram of an example method 500 for maintaining a communication link, according to an embodiment. The method 500 is implemented by the network interface device 100, according to an embodiment, and FIG. 5 is described with reference to FIG. 1 for ease of explanation. In other embodiments, the method 500 is implemented by another suitable network interface device.

In some embodiments, the method 500 is implemented in conjunction with the flow diagrams of FIGS. 2A and 4, and FIG. 5 is described with reference to FIGS. 2A and 4 for ease of explanation. In other embodiments, the method 500 is implemented in conjunction with one or more other suitable flow diagrams different than the flow diagrams of FIGS. 2A and/or 4.

At block 504, a transceiver operates in a low power state in which the transceiver does not transmit via the communication link at least during periodic time slots, according to an embodiment. In another embodiment, the transceiver transmits during the periodic time slots of the low power state, but the transmit power used by the transceiver is significantly less (e.g., at least 10 times less transmit power, a least 50 time less, at least 100 times less, at least 1000 times less, etc.) as compared to transmitting idle symbols outside of the low power state. In either embodiment, power consumption by the transceiver is significantly reduced as compared to the transceiver transmitting idle symbols outside of the low power state. Additionally, power consumption by the link partner is also reduced because the link partner can put at least portions of receive circuitry of the link partner into a low power mode during periodic time slots, as discussed above.

In an embodiment, the transceiver operating in the low power state at block 504 comprises the transceiver operating according to the quiet/refresh cycle described with reference to FIG. 3A and/or 3B, or another suitable quiet/refresh cycle. In an embodiment, the transceiver operating in the low power state at block 504 comprises the transceiver operating according to a quiet/refresh cycle that includes repeating quiet periods in which the transceiver does not transmit (or transmits at significantly less power as compared to transmitting idle symbols outside of the low power state), and repeating refresh periods in which the transceiver transmits signals configured to enable a link partner to update adaptive filters of the link partner and, optionally, to maintain synchronization with the transceiver. In an embodiment, a length of the quiet period is at least 90 times (or 10, 50, 100, 1000 times, etc.) a length of the refresh period. In an illustrative embodiment, the length of the quiet period is about 20-22 milliseconds, and the length of the refresh period is about 200-220 microseconds. In various other embodiments, the length of the quiet period is a suitable length less than or greater than 20-22 milliseconds, and/or the length of the refresh period is a suitable length less than or greater than 200-220 microseconds.

At block 508, the transceiver transitions from the low power state to a recovery state in response to the transceiver determining a low SNR condition. In an embodiment, the recovery state involves the transceiver transmitting idle symbols as discussed above. In an embodiment, transitioning from the low-power state to the recovery state results in a significant increase in power consumption by the transceiver as compared to the low power state because the transceiver continuously transmits idle symbols during the recovery state, as discussed above. In an embodiment, power consumption by the link partner also increases significantly as compared to when the transceiver operates in the low power state because the link partner must keep the receive circuitry of the link partner in an active mode (as opposed to a low power mode) to process the continuously transmitted idle symbols.

In an embodiment, transitioning from the low power state to the recovery state at block 508 is in response to the transceiver receiving, via a communication medium, an indication of the low SNR condition from a link partner. In another embodiment, transitioning from the low power state to the recovery state at block 508 is in response to low SNR detection circuitry (e.g., the low SNR detection circuitry 150 (FIG. 1)) of the transceiver detecting the low SNR condition.

At block 512, the transceiver transitions from the recovery state back to the low power state in response to the transceiver determining that the low SNR condition has ended. When operating in the low power state, power consumption by the transceiver is significantly reduced as compared to the transceiver operating in the recovery state, as discussed above. Additionally, power consumption by the link partner is also reduced because the link partner can put at least portions of receive circuitry of the link partner into a low power mode during periodic time slots, as discussed above.

In an embodiment, the transceiver directly transitions from the recovery state to the low power state at block 512 without the transceiver transitioning to another operating state.

In an embodiment, the transceiver transitions from the recovery state to the low power state at block 512 without the transceiver transitioning the transceiver to a normal operating state. In an embodiment, the normal operating state includes the transceiver continuously transmitting transmission symbols (e.g., transmission symbols corresponding to user data, idle symbols, etc.) on the communication link without any quiet time slots in which the transceiver does not transmit.

In an embodiment, transitioning from the recovery state to the low power state at block 512 comprises a PHY processor (e.g., the PHY processing device 120) of the transceiver transitioning from the link recovery state to the low power state in response to the PHY processor determining that the low SNR condition has ended and without being prompted by a MAC layer processor (e.g., the MAC processing device 110) of the transceiver.

In an embodiment, transitioning from the recovery state to the low power state at block 512 is in response to the transceiver receiving, via the communication medium, an indication that the low SNR condition ended from the link partner. In another embodiment, transitioning from the recovery state to the low power state at block 512 is in response to low SNR detection circuitry (e.g., the low SNR detection circuitry 150 (FIG. 1)) of the transceiver detecting that the low SNR condition has ended.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network interface device, comprising:
   a physical layer (PHY) processor comprising a transceiver, the PHY processor being configured to perform PHY functions associated with a communication link, the PHY processor also comprising a controller configured to:
   operate the PHY processor in a low power state in which the transceiver periodically does not transmit on the communication link during a plurality of quiet time slots,
   in response to determining a low signal-to-noise ratio (SNR) condition associated with the communication link, transition the PHY processor to a link recovery state, wherein operation in the link recovery state includes the PHY processor transmitting idle symbols on the communication link, and
   in response to determining that the low SNR condition has ended, transition the PHY processor from the link recovery state to the low power state.

2. The network interface device of claim 1, wherein the controller is configured to transition the PHY processor from the link recovery state directly to the low power state without transitioning the PHY processor to another operating state.

3. The network interface device of claim 1, wherein the controller is configured to transition the PHY processor from the link recovery state to the low power state without transitioning the transition the PHY processor to a normal operating state.

4. The network interface device of claim 3, wherein the normal operating state includes the transition the PHY processor continuously transmitting transmission symbols on the communication link without any quiet time slots in which the PHY processor does not transmit.

5. The network interface device of claim 1, wherein:
   the network interface device further comprises a media access control (MAC) layer processor communicatively coupled to the PHY processor, the MAC layer processor being configured to perform MAC layer functions associated with the communication link; and
   the controller is configured to transition the PHY processor from the link recovery state to the low power state in response to the PHY processor determining that the low SNR condition has ended and without being prompted the MAC layer processor.

6. The network interface device of claim 5, wherein:
   the MAC layer processor comprises a processor and a memory coupled to the processor, the processor configured to execute machine readable instructions stored in the memory, the machine readable instructions including instructions that, when executed by the processor, cause the processor to perform the MAC layer functions associated with the communication link.

7. The network interface device of claim 1, wherein the controller is configured to:
   transition the PHY processor to the link recovery state in response to the PHY processor receiving, from a link partner via the communication link, an indication that the link partner detected the low SNR condition at the link partner; and
   transition the PHY processor from the link recovery state to the low power state in response to the PHY processor receiving, from the link partner via the communication link, an indication that the low SNR condition at the link partner has ended.

8. The network interface device of claim 1, wherein:
   the PHY processor comprises low SNR detection circuitry configured to detect the low SNR condition at the network interface device; and
   the controller is configured to:
   transition the PHY processor to the link recovery state in response to the low SNR detection circuitry detecting the low SNR condition at the network interface device, and
   transition the PHY processor from the link recovery state to the low power state in response to the low SNR detection circuitry detecting the low SNR condition at the network interface device has ended.

9. The network interface device of claim 1, wherein the PHY processor is configured to operate in the low power state according to a repeating quiet/refresh cycle, each of at least some of the quiet refresh cycles comprising:
   a quiet time slot during which the network interface device does not transmit on the communication link; and
   a refresh time slot during which the network interface device transmits signals configured to enable a link partner to update adaptive filters of the link partner.

10. The network interface device of claim 1, wherein the PHY processor is configured to operate in the link recovery state at least by continuously transmitting idle symbols on the communication link without any quiet time slots in which the network interface device does not transmit on the communication link.

11. The network interface device of claim 1, wherein the PHY processor comprises a hardware state machine configured to:
in response to determining the SNR condition associated with the communication link, transition the PHY processor to the link recovery state; and
in response to determining that the low SNR condition has ended, transition the PHY processor from the link recovery state to the low power state.

12. The network interface device of claim 1, wherein the PHY processor comprises a processor a memory, the PHY processor is configured to execute machine readable instructions stored in the memory, and the memory stores instructions that, when executed by the processor, cause the processor to:
in response to determining the SNR condition associated with the communication link, transition the PHY processor to the link recovery state; and
in response to determining that the low SNR condition has ended, transition the PHY processor from the link recovery state to the low power state.

13. The network interface device of claim 1, wherein at least transmit-side circuitry of the PHY processor is configured to consume, during the low power state, less than 50% of power consumed during the link recovery state.

14. A method for maintaining a communication link, the method comprising:
operating a network interface device in a low power state in which the network interface device periodically does not transmit on the communication link during a plurality of quiet time slots;
in response to determining a low signal-to-noise ratio (SNR) condition associated with the communication link, transitioning the network interface device to a link recovery state, wherein operation in the link recovery state includes the network interface device transmitting idle symbols on the communication link; and
in response to determining that the low SNR condition has ended, transitioning the network interface device from the link recovery state to the low power state.

15. The method of claim 14, wherein transitioning the network interface device from the link recovery state to the low power state comprises transitioning the network interface device from the link recovery state directly to the low power state without transitioning the network interface device to another operating state.

16. The method of claim 14, wherein transitioning the network interface device from the link recovery state to the low power state comprises transitioning the network interface device from the link recovery state to the low power state without transitioning the network interface device to a normal operating state.

17. The method of claim 16, wherein the normal operating state includes the network interface device continuously transmitting transmission symbols on the communication link without any quiet time slots in which the network interface device does not transmit.

18. The method of claim 14, wherein transitioning the network interface device from the link recovery state to the low power state comprises a physical layer (PHY) processor of the network interface device transitioning from the link recovery state to the low power state in response to the PHY processor determining that the low SNR condition has ended and without being prompted by a media access control (MAC) layer processor of the network interface device.

19. The method of claim 14, wherein:
transitioning the network interface device to the link recovery state comprises transitioning the network interface device to the link recovery state in response to the network interface device receiving, from a link partner via the communication link, an indication that the link partner detected the low SNR condition at the link partner; and
transitioning the network interface device from the link recovery state to the low power state comprises transitioning the network interface device from the link recovery state to the low power state in response to the network interface device receiving, from the link partner via the communication link, an indication that the low SNR condition at the link partner has ended.

20. The method of claim 14, wherein:
transitioning the network interface device to the link recovery state comprises transitioning the network interface device to the link recovery state in response to the network interface device detecting the low SNR condition at the network interface device; and
transitioning the network interface device from the link recovery state to the low power state comprises transitioning the network interface device from the link recovery state to the low power state in response to the network interface device detecting the low SNR condition at the network interface device has ended.

21. The method of claim 14, wherein operating the network interface device in the low power state comprises:
operating the network interface device according to a repeating quiet/refresh cycle, each of at least some of the quiet refresh cycles comprising:
a quiet time slot during which the network interface device does not transmit on the communication link; and
a refresh time slot during which the network interface device transmits signals configured to enable a link partner to update adaptive filters of the link partner.

22. The method of claim 14, wherein operation in the link recovery state includes the network interface device continuously transmitting idle symbols on the communication link without any quiet time slots in which the network interface device does not transmit on the communication link.

23. The method of claim 14, further comprising, after transitioning the network interface device from the link recovery state to the low power state, consuming, by at least transmit-side circuitry of the network interface device, less than 50% of power consumed by the at least transmit-side circuitry of the network interface device during the link recovery state.

* * * * *